May 16, 1967   J. J. G. GOUBIE   3,319,758
LANDING FOR CONVEYORS
Filed Nov. 12, 1965   2 Sheets-Sheet 1

INVENTOR
JACQUES JEAN GEORGES GOUBIE

BY *Pierce, Scheffler & Parker*
ATTORNEYS

May 16, 1967  J. J. G. GOUBIE  3,319,758
LANDING FOR CONVEYORS

Filed Nov. 12, 1965  2 Sheets-Sheet 2

INVENTOR
JACQUES JEAN GEORGES GOUBIE

BY Pierre Scheffler & Parker
ATTORNEYS

United States Patent Office 3,319,758
Patented May 16, 1967

3,319,758
LANDING FOR CONVEYORS
Jacques Jean Georges Goubie, Taverny, France, assignor to Sandvikens Jernverks Aktiebolag, Sandviken, Sweden, a corporation of Sweden
Filed Nov. 12, 1965, Ser. No. 507,479
Claims priority, application France, Nov. 13, 1964, 994,820, Patent 1,422,334
3 Claims. (Cl. 198—16)

The present invention relates to a landing for a conveyor, as a passenger conveyor belt, a moving staircase and in general a movable surface having longitudinal ribs on the top surface.

In order that persons or other objects travelling on the conveyor are safely and smoothly transferred from the conveyor to a landing on the stationary structure or from such landing to the conveyor, the landing is often provided with an edge shaped as a comb with teeth entering between the ribs of the conveyor.

It is a purpose of the present invention to provide an improvement of previous combs in order to facilitate the transfer of all kinds of objects between the conveyor and the landing including objects which with previous combs have caused difficulties as for instance persons having shoes with pointed heels.

For this purpose the comb according to the invention has teeth which extend longitudinally to different positions, the ends of the teeth forming a zig-zag line.

Figure 1:
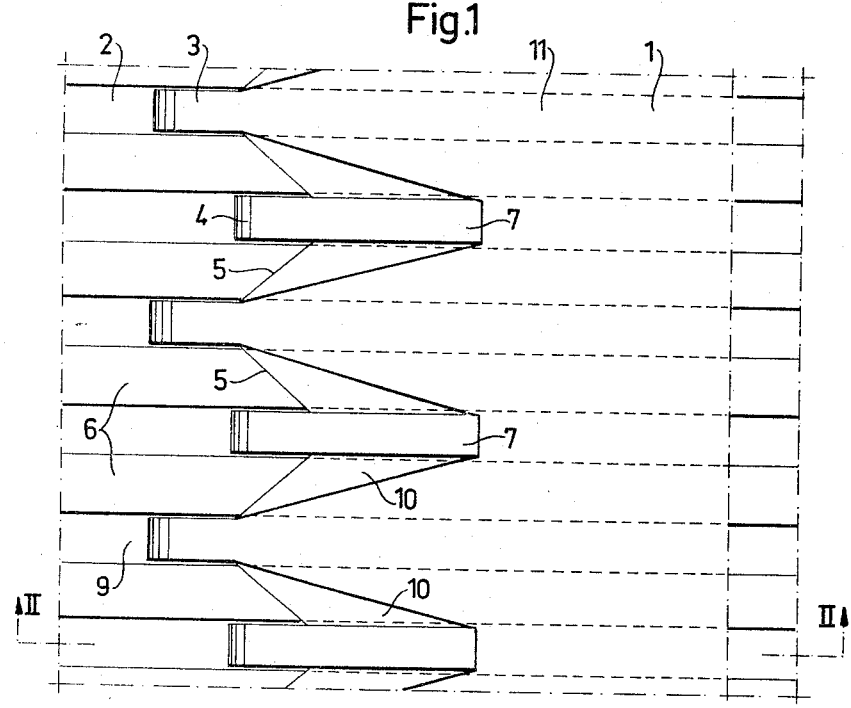

Closer details of the invention appear from the following specification and the enclosed drawing showing:

FIG. 1: An elevational view of a fragment of a conveyor and a comb according to the invention.

Figure 2:
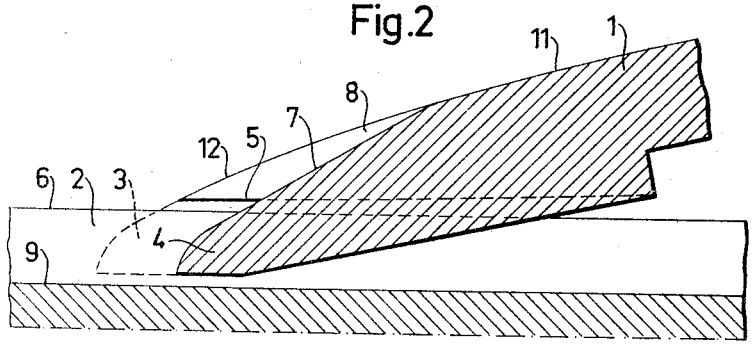

FIG. 2: A cross section on the line II—II in FIG. 1.

Figure 3:
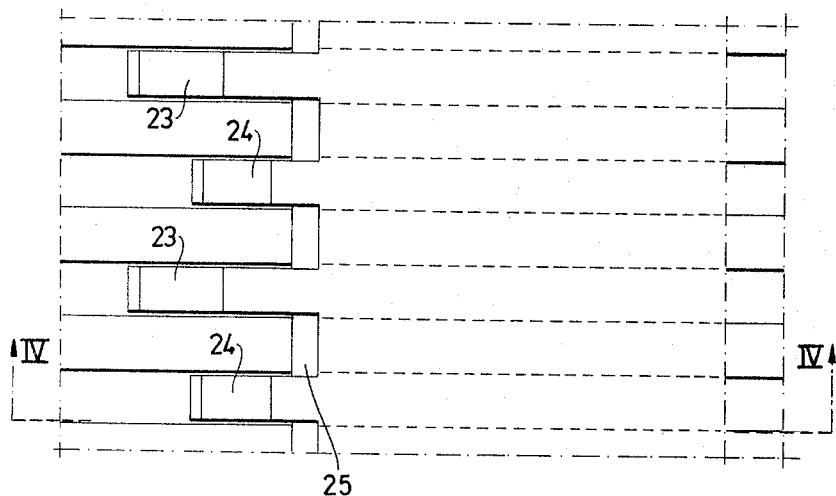

FIG. 3: An elevational view of a modified embodiment of the invention in FIG. 1.

Figure 4:
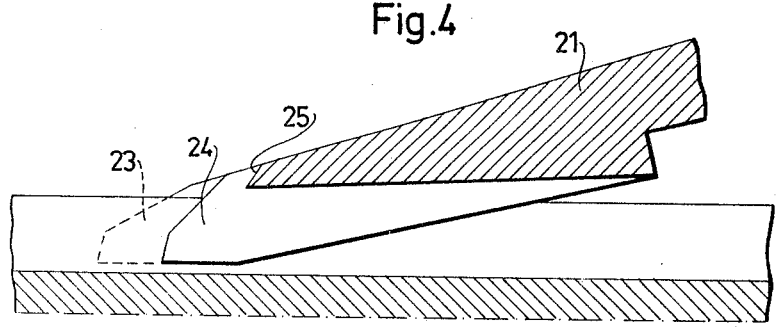

FIG. 4: A cross section on the line IV—IV in FIG. 1.

FIGS. 1 and 2 show the edge of a landing 1 and a conveyor 2 having longitudinal ribs 6 spaced by grooves 9. The ribs and grooves are illustrated as having a rectangular cross section, which is the most common case, but the invention can also be used for grooves and ribs having inclined sides. The edge of the landing is shaped as a comb having longitudinally protruding teeth 3 and 4 which enter between the ribs of the conveyor.

Every second tooth is marked 3 and the teeth therebetween are marked 4. The teeth 3 protrude longitudinally more than do the teeth 4 and have an upper surface 12 which is less inclined than is the upper surface 7 of the teeth 4.

Between the teeth 3 and 4 there are obliquely inclined surfaces 10, each lower edge 5 of which is situated above and close to the top surface of a rib 6 in the conveyor. The upper surface 7 of each tooth 4 forms, together with said oblique surfaces, a groove 8 which tapers upwardly-laterally towards the landing.

FIGS. 3 and 4 show a modification of the landing illustrated in FIGS. 1 and 2. The landing 21 has teeth of which every second 23 protrudes longitudinally more than the other teeth 24. The obliquely inclined surfaces 10 are omitted in this embodiment.

The illustrated landing has practically been found more effective than previous landings in providing a smooth and undisturbed passage from the belt to the landing and vice versa.

The comb shaped edge often forms a separate comb plate, which either can be rigidly fastened to the landing by means of screws for instance, or can be transversely shiftable on the landing in order to follow the lateral shiftings of the conveyor.

In the foregoing there is illustrated a comb having every second tooth protruding longitudinally more than the intermediate teeth. This can be varied, so that the teeth protrude longitudinally to three or more different positions, the points of the teeth forming a zig-zag line.

From the foregoing it is obvious that objects travelling on the conveyor towards the landing and situated in the bottom of the grooves 9 will be raised by the teeth up to the level 11 of the landing. Objects travelling on top of the ridges 6 will be raised by the intermediate portions 10 in FIG. 1 or 25 in FIG. 3. A narrow heel having a width slightly greater than the space between two adjacent teeth and travelling on the top 6 of a ridge will not be pinched between two adjacent teeth because of the different longitudinal positions of said teeth.

I claim:

1. Landing for a longitudinally ribbed conveyor moving longitudinally in relation to the landing, said landing having the edge adjacent the conveyor shaped as a comb, the teeth of which enter between the ribs of the conveyor, the teeth having different longitudinal protrusion from the landing, so that the points of the teeth form a zig-zag line.

2. Landing according to claim 1, in which every second tooth protrudes longitudinally more than the intermediate teeth.

3. Landing for a longitudinally ribbed movable conveyor, said landing having the edge thereof adjacent the conveyor shaped as a comb the teeth of which enter between the ribs of the conveyor, in which the teeth protrude longitudinally from the landing by different extents, every second tooth protruding longitudinally more than does the intermediate tooth, so that the points of the teeth form a zig-zag line, the sides of the teeth which have a greater lateral protrusion being obliquely inclined in such a way that the top surface along the intermediate teeth together with the obliquely inclined surfaces form a groove, which tapers rearwardly in the direction towards the landing.

References Cited by the Examiner
UNITED STATES PATENTS
3,247,947   4/1966   Fox _____ 104—25 X EVON C. BLUNK, *Primary Examiner.*
E. A. SROKA, *Assistant Examiner.*